(12) United States Patent
Liao

(10) Patent No.: US 7,270,357 B1
(45) Date of Patent: Sep. 18, 2007

(54) DISTANCE AND ORIENTATION ADJUSTABLE SUCTION DEVICE

(75) Inventor: Po Lin Liao, Taichung (TW)

(73) Assignee: Lih Yann Industrial Co., Ltd., Taichung (TW)

( * ) Notice: Subject to any disclaimer, the term of this patent is extended or adjusted under 35 U.S.C. 154(b) by 0 days.

(21) Appl. No.: 11/376,246

(22) Filed: Mar. 16, 2006

(51) Int. Cl.
*B25J 15/06* (2006.01)
*B66C 1/02* (2006.01)

(52) U.S. Cl. .................................. 294/65; 294/15
(58) Field of Classification Search ........... 294/64.1, 294/65; 248/205.8, 206.2
See application file for complete search history.

(56) References Cited

U.S. PATENT DOCUMENTS

| | | | | |
|---|---|---|---|---|
| 3,180,604 A | * | 4/1965 | Hammer | 248/205.8 |
| 5,165,164 A | * | 11/1992 | Kubo et al. | 29/784 |
| 6,101,702 A | * | 8/2000 | Claycomb et al. | 29/426.4 |
| 6,145,901 A | * | 11/2000 | Rich | 294/64.1 |
| 7,021,593 B1 | * | 4/2006 | Fan | 248/206.2 |

* cited by examiner

*Primary Examiner*—Patrick Mackey
*Assistant Examiner*—Paul T Chin
(74) *Attorney, Agent, or Firm*—Leong C. Lei

(57) ABSTRACT

A distance and orientation adjustable suction device includes two suction cups and a controlling mechanism connected between the suction cups. Each suction cup has a rotatable mounting block. The controlling mechanism includes a main body forming a knuckle joint with the mounting block of one suction cup and defines a channel movably receiving a rack that threadingly engages a internally-threaded cylinder that forms a knuckle with the mounting block of the other suction cup. Thus, the suction cups are each rotatable about two axes with respect to the main body and are linear movable with respect to each other. Further, the threading engagement between the cylinder and the rack allows for minute adjustment between linear distance between the suction cups.

5 Claims, 7 Drawing Sheets

DISTANCE AND ORIENTATION ADJUSTABLE SUCTION DEVICE

BACKGROUND OF THE INVENTION

1. Field of the Invention

The present invention relates generally to a device for holding and moving stones with suction forces, and in particular to a suction device that allows for minute distance adjustment, fixed-step advancing, and orientation adjustment between stone workpieces.

2. The Related Art

It is common in stone industry or construction industry to move and properly position heavy stone workpieces, such as marble blocks. This is usually done with suction device that applies a suction force to the stone workpieces for picking up and conveying the stone workpieces.

However, the conventional devices can only roughly position the suction-retained stone at an approximately location, and location adjustment is usually done manually with visual inspection. This makes it very difficult to precisely position the stones, especially to provide a precise gap between two stones or two stone slabs. Imprecise positioning of stones may deteriorate appearance of a finished job and even causes property damage and casualty.

A distance adjustable suction device is available, which is shown in FIG. 1 of the attached drawings. The suction device, generally designated with reference numeral 1, comprises first and second suction cups 10, 11, which are connected together by toothed racks 12 extending therebetween. First ends of the racks 12 are fixed to the first suction cup 10, while the other ends form teeth. A rotary handle 13 is rotatably mounted to the second suction cup 11 and comprises ratchet pinions 131 rotatably supported thereon. The ratchet pinions 131 matingly engage the teeth of the racks 12, respectively. By repeatedly and reciprocally rotating the handle with respect to the second suction cup 11, the ratchet pinions 131 that engage the racks 12 drive the racks 12 to move the first suction cup 10 with respect to the second suction cup 11 in a step by step manner. Thus, the distance between the first and second suction cups 10, 11 can be adjusted.

However, since the distance moved by a step of the racks 12 induced by the handle 13 is determined by the pitch of the teeth of the racks 12. It is not possible to do distance adjustment of a fraction of one step of the racks 12. Thus fine adjustment is in general very difficult, if not impossible.

Further, the arrangement of the racks 12, which are generally rigid, between the first and second suction cups makes it not possible for applications where the first and second suction cups are attached to stones that are at different levels, or that are of an inclined spatial relationship.

Thus, it is desired to have a suction device for stones that overcomes the above-discussed problems of the conventional devices.

SUMMARY OF THE INVENTION

Thus, the present invention is aimed to provide a suction device that can do fine adjustment of distance between two heavy articles that are suction-retained by suction cups of the suction device, while still allows the heavy articles to be moved with respect to each other in a step by step manner.

Another objective of the present invention is to provide a suction device that allows two heavy articles that are suction-retained by suction cups of the suction device to be oriented in an angle with respect to each other for adjusting orientation between the articles.

To achieve the above objectives, in accordance with the present invention, a suction device is provided, comprising two suction cups and a controlling mechanism connected between the suction cups. Each suction cup comprises a rotatable mounting block. The controlling mechanism comprises a main body forming a knuckle joint with the mounting block of one suction cup and defines a channel movably receiving a rack that threadingly engages a internally-threaded cylinder that forms a knuckle with the mounting block of the other suction cup. Thus, the suction cups are each rotatable about two axes with respect to the main body and are linear movable with respect to each other. Further, the threading engagement between the cylinder and the rack allows for minute adjustment between linear distance between the suction cups.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
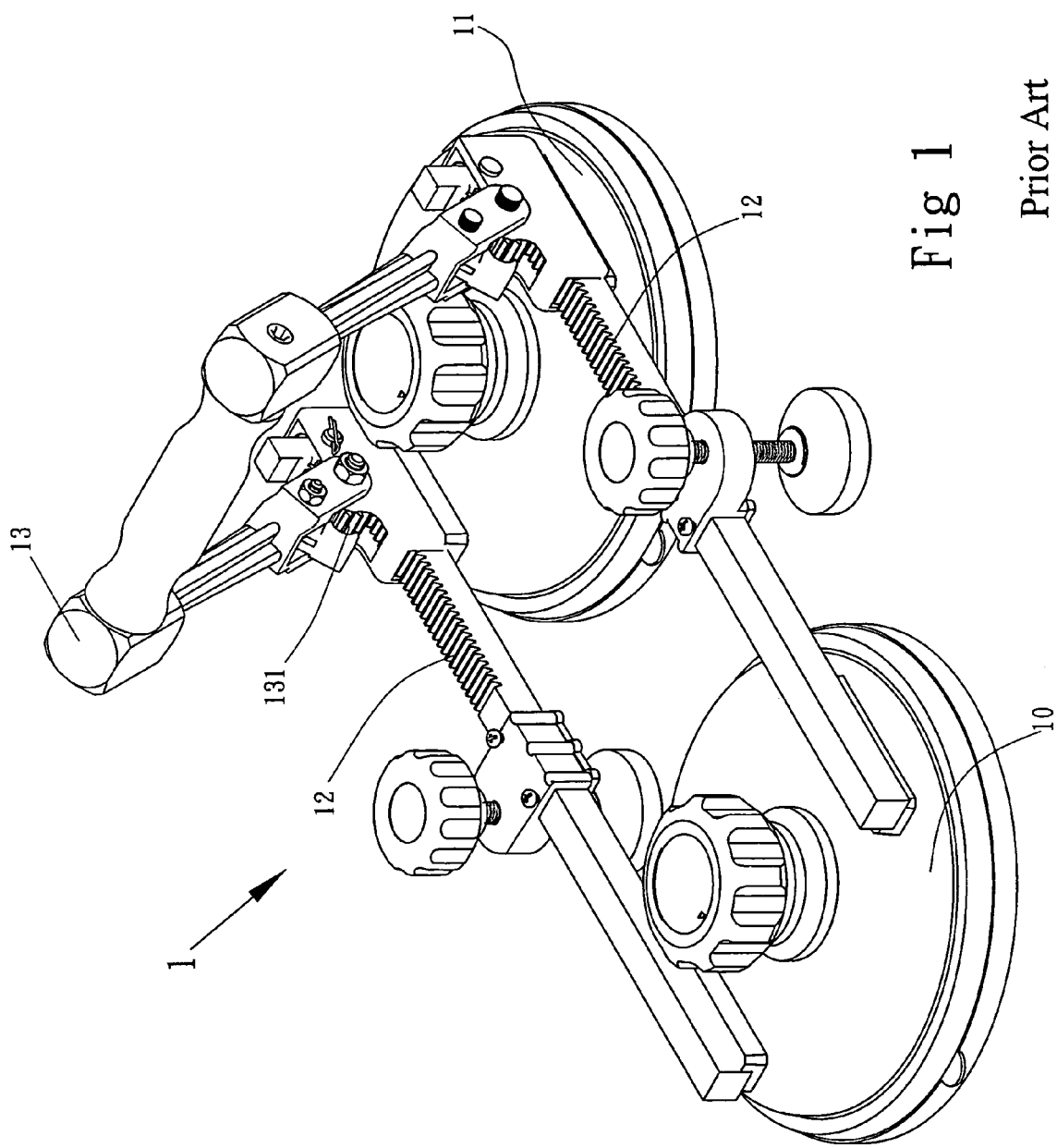
FIG. 1 is a perspective view showing a conventional suction device for retaining and moving stone workpieces with respect to each other.
Figure 2:
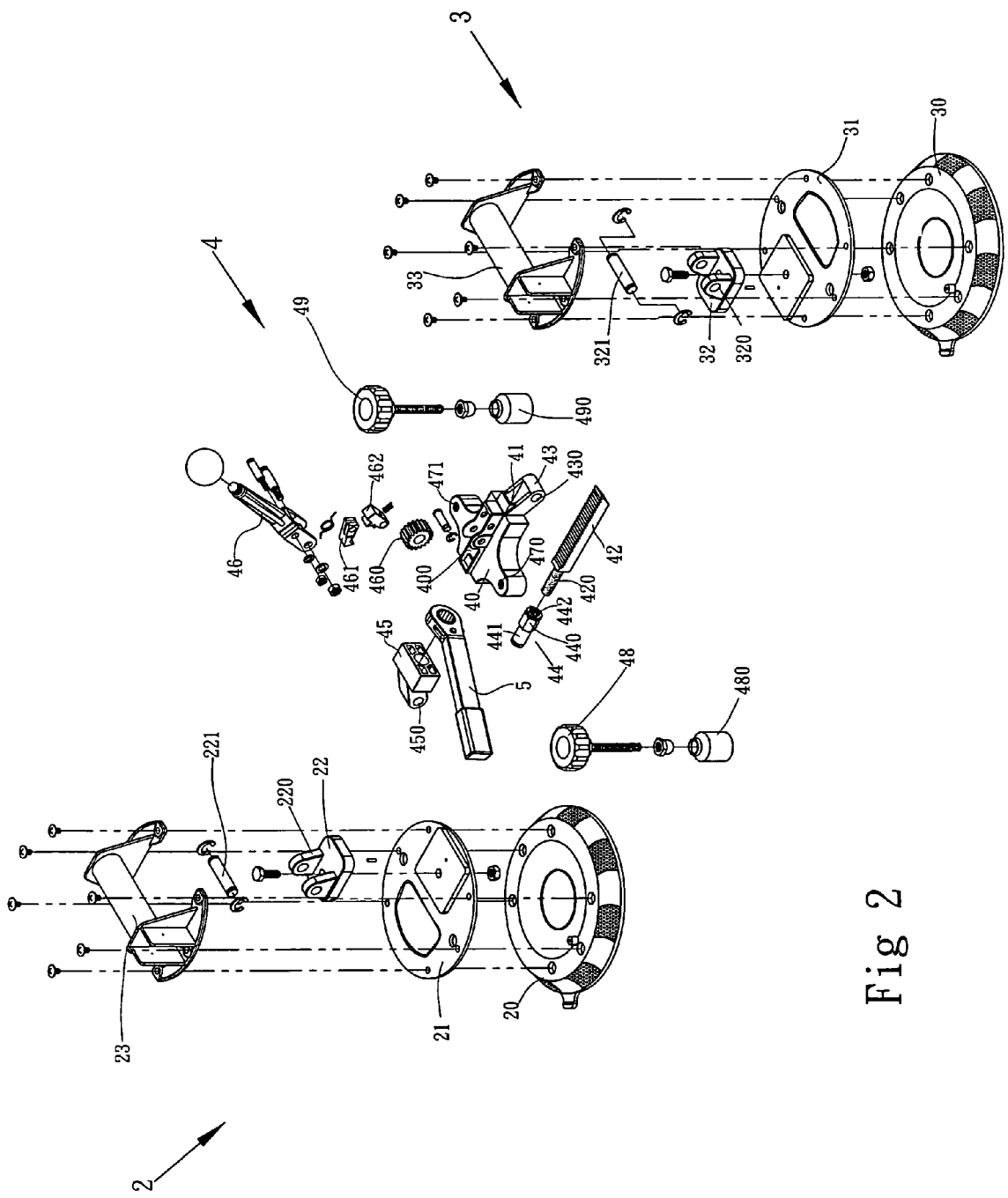
FIG. 2 is an exploded view of a suction device constructed in accordance with the present invention.
Figure 3:
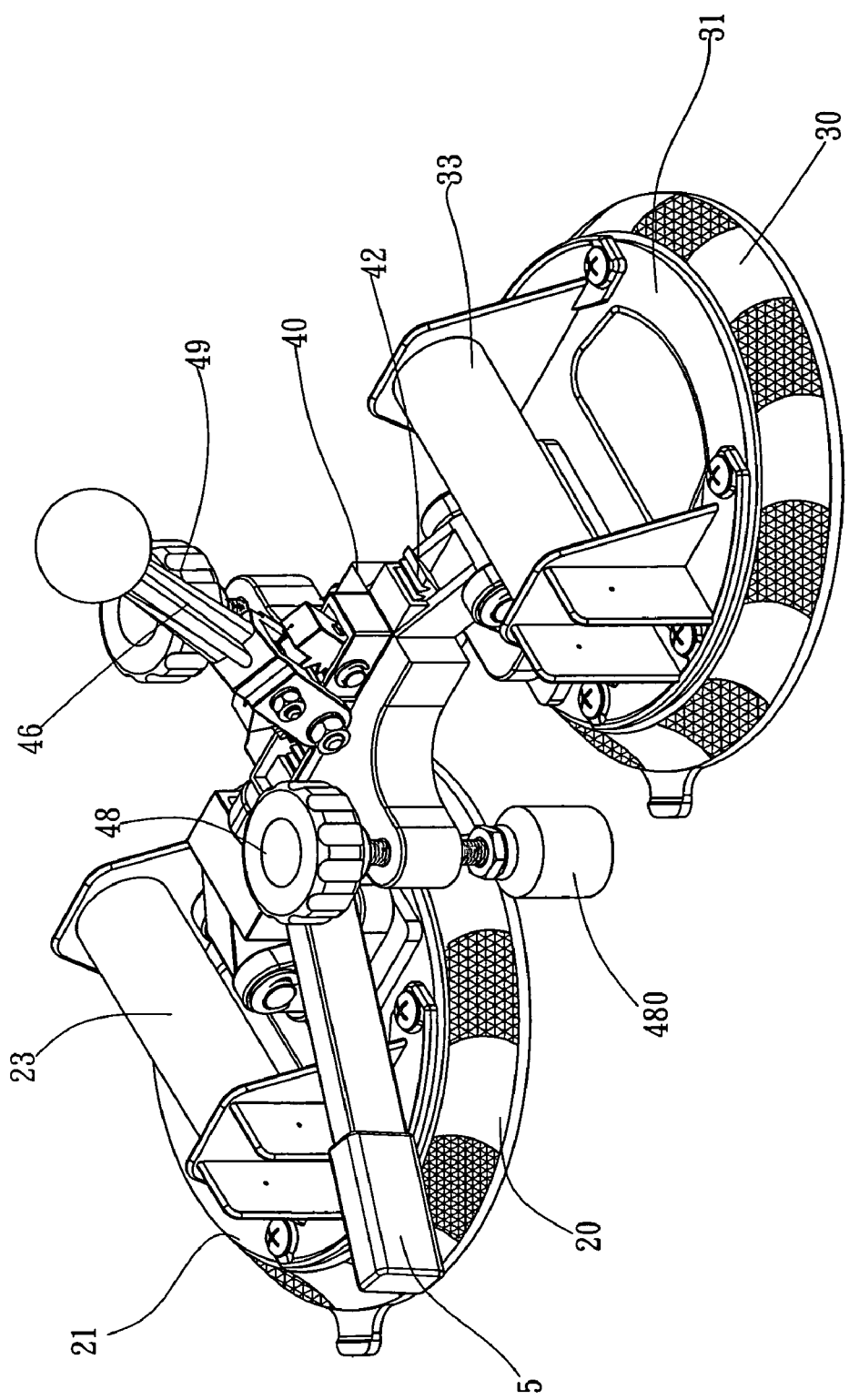
FIG. 3 is a perspective view of the suction device of the present invention.
Figure 4:
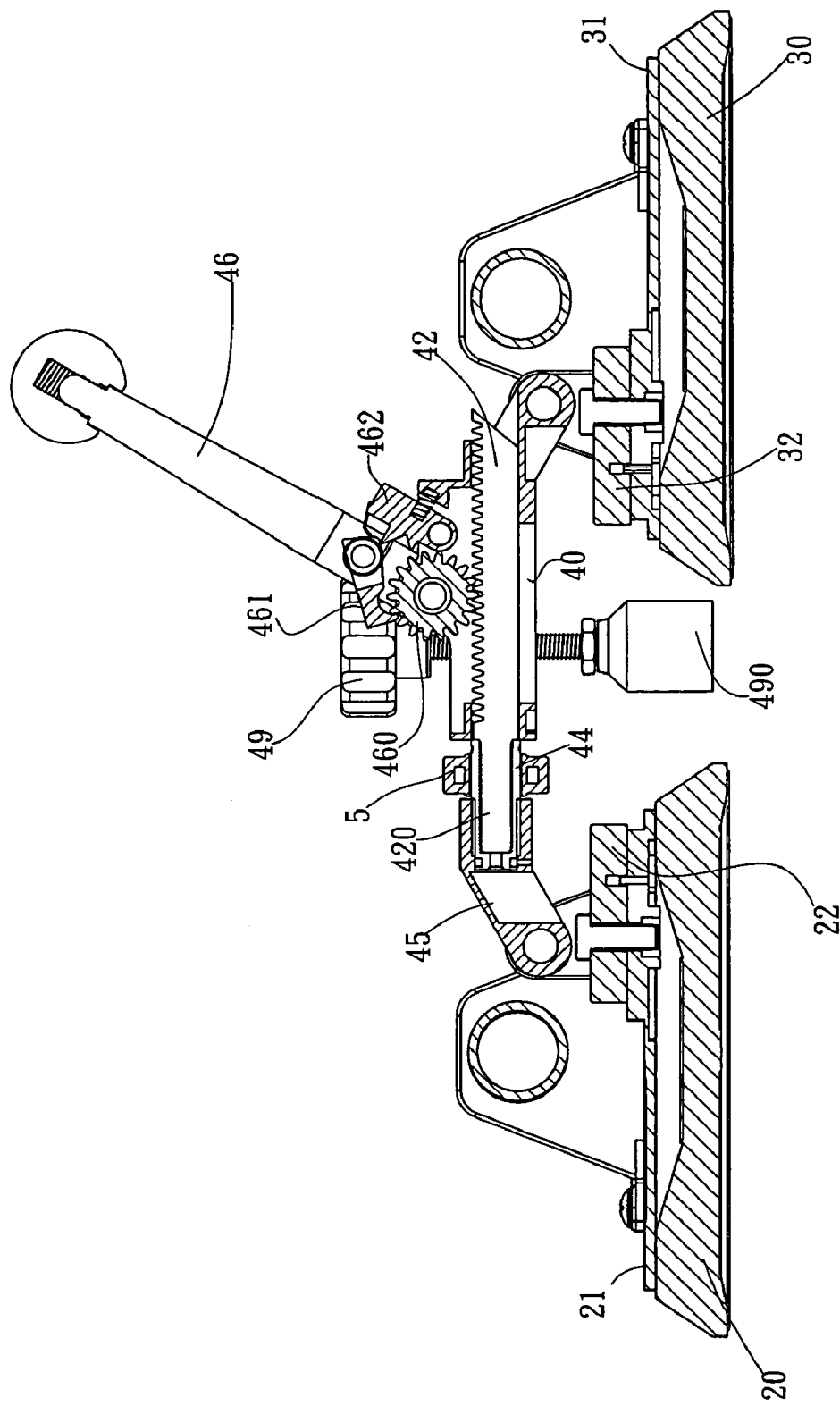
FIG. 4 is a cross-sectional view of the suction device of the present invention.

With reference to the drawings and in particular to FIGS. 2, 3 and 4, a suction device constructed in accordance with the present invention comprises first and second suction cups 2, 3 spaced from each other with a controlling mechanism 4 connecting between the suction cups 2, 3 to adjust the distance between the suction cups 2, 3. Each suction cup 2, 3 comprise a flexible cup body 20, 30 mounted to an underside of a support disk 21, 31. A mounting block 22, 32 is fixed to a top side of each support disk 21, 31 in a free rotation manner. In other words, the mounting blocks 22, 32 are allowed to freely rotate with respect to the support disks 21, 31 about an axis substantially normal to the support disk 21, 31. The mounting block 22, 32 forms two spaced lugs 320 in which aligned holes are defined to rotatably receive a pivot pin 221, 321. A handgrip or handle 23, 33 is fixed to the top side of the support disk 21, 31 by suitable fastener means, such as blots shown in the drawings, and is above the mounting block 22, 32 for easy access and hand holding by a user.

The controlling mechanism 4 comprises a main body 40 arranged between the first and second suction cups 2, 3. The main body 40 defines a channel 41 through which a toothed bar or rack 42 movably extends. At one side of the main body 4, a connection member 43 is formed, preferably adjacent to an opening of the channel 41 through which an end of the rack 42 may extends beyond the main body 4. The connection member 43 is sized and shaped to fit into the space between the lugs 320 of the mounting block 32 of the second suction cup 3, and defines a transverse bore 430 for the extension of the pivot pin 321, whereby the mounting block 32, the pivot pin 321, and the connection member 43 together form a knuckle joint between the second suction cup 3 and the main body 40 of the controlling mechanism 4. The knuckle joint allows the second suction cup 3 to rotate or incline with respect to the main body 40 of the controlling mechanism 4.

An opposite end of the rack 42 forms a threaded section 420, which extends beyond the main body 40 through an opposite opening of the channel 41. A movable cylinder 44 has a first hexagonal or polygonal section 440 that defines an internally threaded bore 442 engageable with the threaded section 420 of the rack 42, and a second, preferably cylindrical, section 441.

A ratchet wrench 5 or similar tool selectively engages the polygonal section 440 of the movable cylinder 44, whereby manually operating the wrench 5 to rotate the movable cylinder 44 causes the movable cylinder 44 to move axially with respect to the threaded section 420 of the rack 42.

The second section 441 of the movable cylinder 44 is coupled to a connection block 45, which has an extension (not labeled) sized and shaped to fit between the lugs 220 of the mounting block 22. The extension defines a bore 450 aligned with the holes defined in the lugs 220 for the extension of the pivot pin 221, thereby forming a knuckle joint between the rack 42 and the first suction cup 2. This allows the first suction cup 2 to be rotatable with respect to the controlling mechanism 4.

The main body 40 also defines a slot 400 partially co-extensive with and in communication with the channel 41. A rotary handle 46 is rotatably mounted to the main body 40 and rotatably supports a ratcheting pinion 461 that partially extends through the slot 400 defined in the main body 40 to matingly and drivingly engage the rack 42 that is movably receives in the channel 41 of the main body 40. Also mounted to the rotary handle 46 are a pawl 461 that engages teeth of the ratcheting pinion 461 to force the pinion 461 to rotate for driving the rack 42 when the rotary handle 46 is manually rotated, and a stop block 462 that limits the rotational stroke of the rotary handle 46.

Two threaded holes 470, 471 are defined on opposite side extensions of the main body for each threadingly receiving and engaging an adjustment bolt 48, 49. A lower end of the adjustment bolt 48, 49 is mounted to a foot block 480, 490, which are positionable on surfaces of stone blocks to support the suction device in an adjustable manner by the rotation of the bolts 48, 49 with respect to the main body 40.

Figure 5:
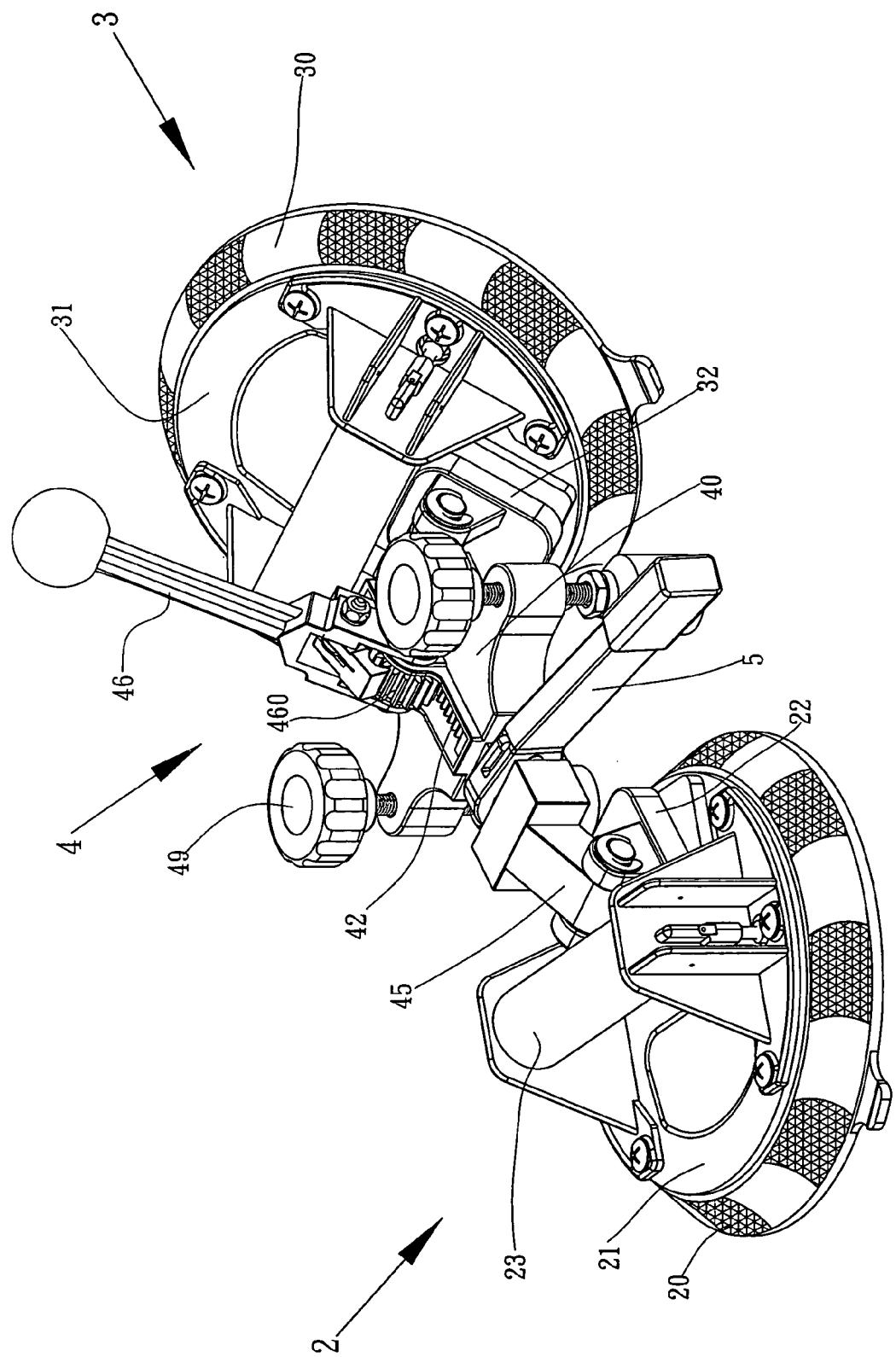
FIG. 5 is a perspective view illustrating the operation of the suction device of the present invention.
Figure 6:
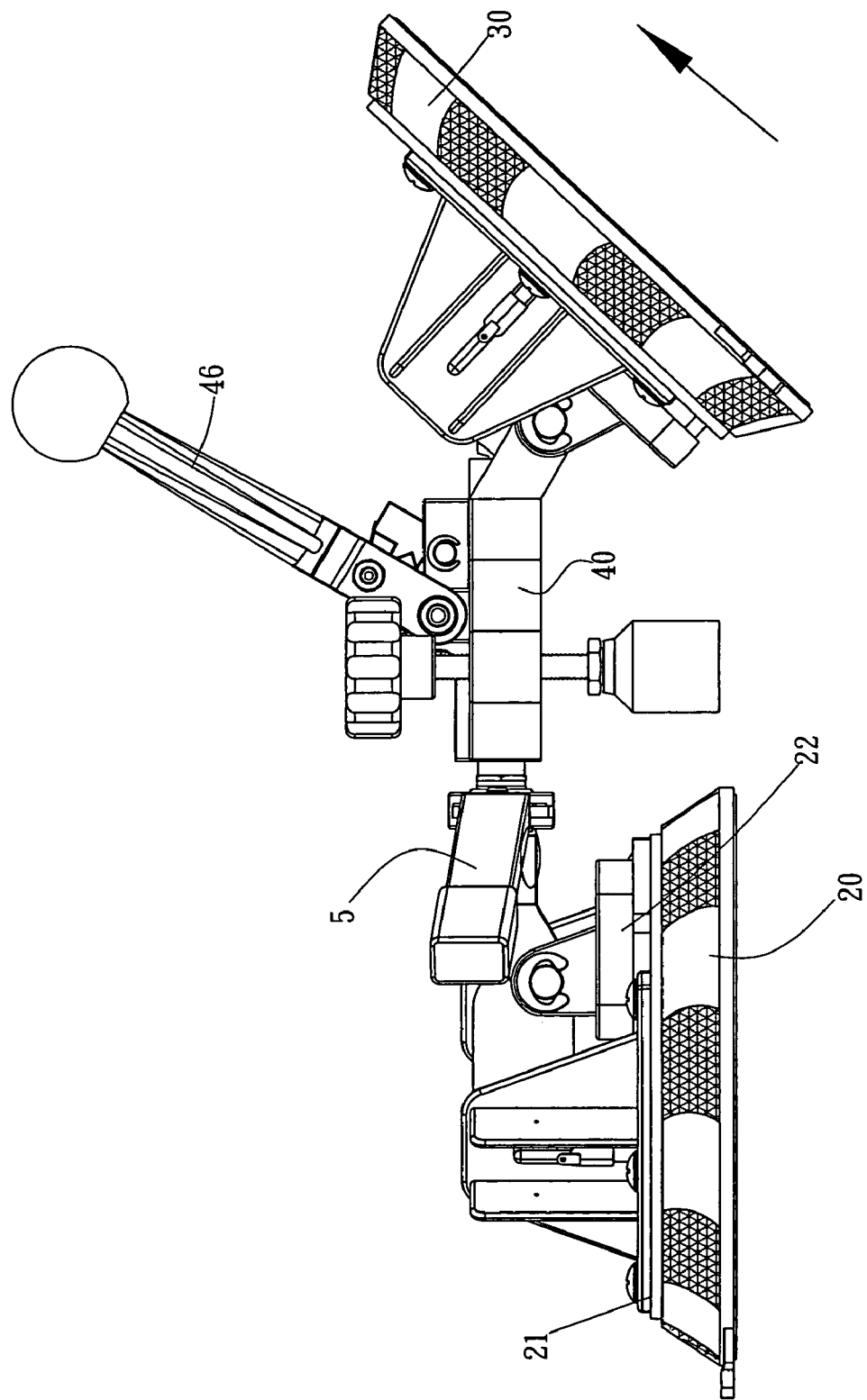
FIG. 6 is a side elevational view illustrating the operation of the suction device of the present invention.
Figure 7:
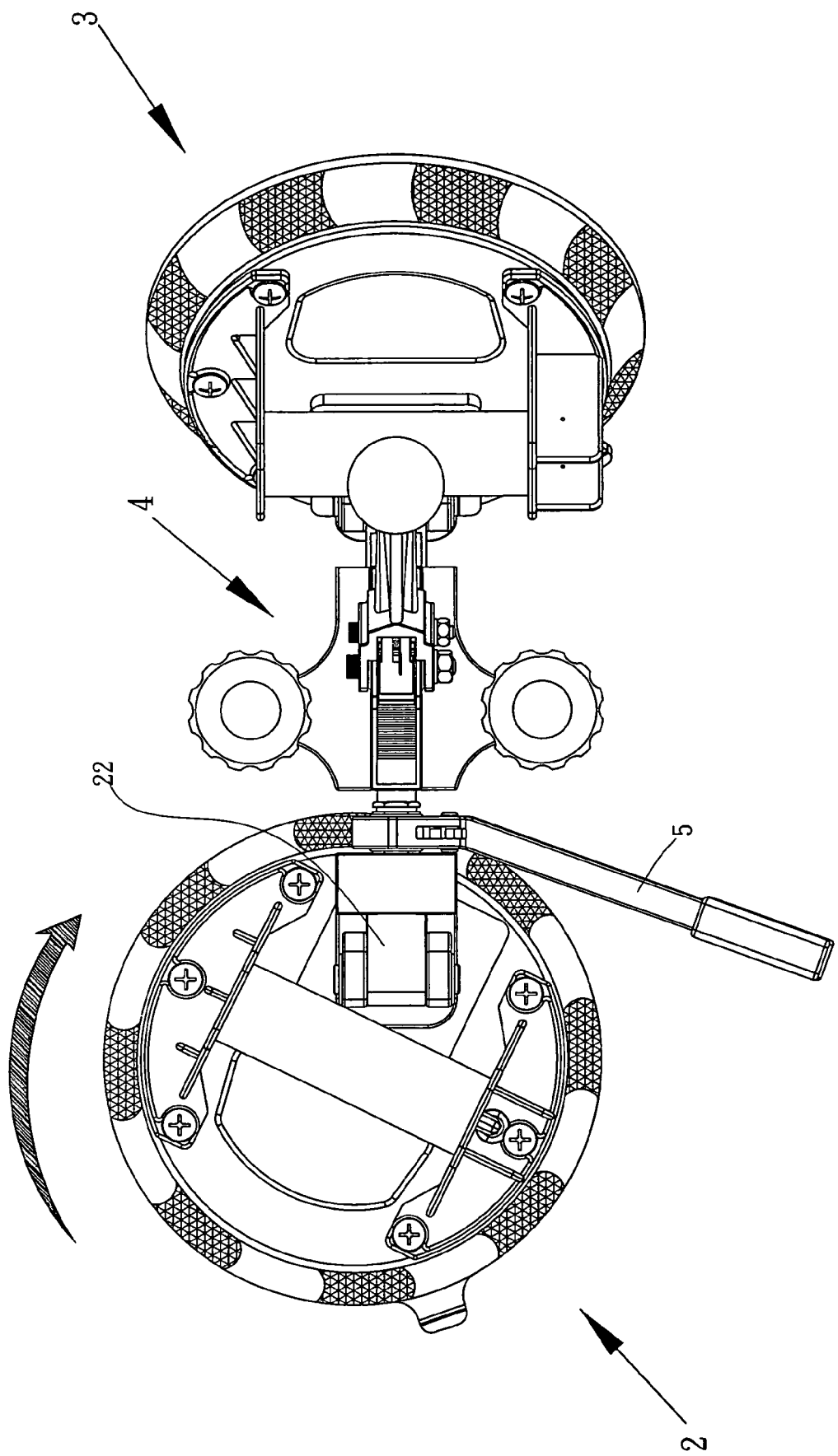
FIG. 7 is a top view illustrating the operation of the suction device of the present invention.

Referring to FIGS. 5-7, the operation of the suction device will be explained. The first and second suction cups 2, 3 are respectively positioned on two stone blocks or slabs, which can be for example a fixed reference stone block and a stone block to be moved with respect to the reference one for adjusting distance or spatial relationship therebetween. The suction cups 2, 3 are fixed to the stone blocks by suction forces. This is generally known in the art and no further description is not necessary.

The mounting block 22, 32 is rotatably mounted to the support disk 21, 31 of the suction cup 2, 3. Thus, the stone block that is suction-fixed to the suction cup 2, 3 is allowed to rotate freely with respect to the main body 40 of the suction device, about an axis that are substantially normal to the support disk 21, 31, for carrying out adjustment of relative angular position between the stone blocks.

The suction cups 2, 3 are rotatably attached to the main body 40 of the controlling mechanism 4 by the knuckle joints thereof. This allows the stone blocks that are carried by the suction cups 2, 3 to rotate, about axes that are substantially parallel to the support disks 21, 31, with respect to each other and the main body 40 of the controlling mechanism 4.

Further, the first suction cup 2, together with the stone carried thereby, is allowed to do translation with respect to the second suction cup 3 and the stone carried by the second suction cup 3 by means of the movement of the rack 42 caused by the manual rotation of the rotary handle 46. With a combination of the above described rotation about the axis normal to the support disk, rotation about the axis parallel to the support disk, and translation, the spatial relationship between the two stone blocks carried by the suction cups 2, 3 can be easily adjusted.

In addition, the distance between the two stone blocks can be adjusted in a minute advance manner. This is done with the threading engagement between the movable cylinder 44 and the rack 42 by manual rotation of the movable cylinder 44 with the wrench 5.

Further, with the foot blocks 480, 490 properly positioned on the stone blocks, the adjustment blots 48, 49 can be used to securely hold the suction device on the stone blocks to be adjusted.

Although the present invention has been described with reference to the preferred embodiment with reference to the drawings thereof, it is apparent to those skilled in the art that a variety of modifications and changes may be made without departing from the scope of the present invention which is intended to be defined by the appended claims.

What is claimed is:

1. An adjustable suction device comprising:

first and second suction cups, each comprising a cup body mounted to an underside of a support disk, a mounting block rotatably fixed to a top side of the support disk to be rotatable about a first axis with respect to the support disk, a pivot mounted on the support disk and defines a second axis;

a controlling mechanism arranged and coupled between the first and second suction cups, the controlling mechanism comprising a main body defining a channel therethrough, a rack movably received in the channel, an end of the main body being rotatably mounted to the second suction cup via the pivot of the second suction cup so as to allow the second cup to rotate about the pivot with respect to the main body, an end of the rack forming a threaded section engaging an inner-threaded cylinder whereby rotation of the cylinder causes the cylinder to axially move along the threaded section of the rack whereby the cylinder is moved with respect to the main body, the cylinder being rotatably mounted to the first suction cup through the pivot of the first suction cup so as to allow the first suction cup to rotate about the second axis with respect to the main body;

the controlling mechanism further comprising a manually operated pinion that drivingly engages the rack whereby manual operation of the pinion drives the rack and inducing translation of the first suction cup with respect to the second suction cup.

2. The adjustable suction device as claimed in claim 1 further comprising a rotary handle rotatably mounted to the main body and supporting the pinion, a pawl engaging the pinion whereby manual rotation of the handle causes the pinion to drive the rack.

3. The adjustable suction device as claimed in claim 2 further comprising a stop block to limit the rotation of the handle.

4. The adjustable suction device as claimed in claim 1 further comprising two adjustment bolts engaging threaded holes defined in the main body and having foot blocks adapted to be positioned on articles suction-fixed to the suction cups.

5. The adjustable suction device as claimed in claim 1, wherein the cylinder comprises a polygon section engageable with a tool for manual rotation of the cylinder.

* * * * *